United States Patent
Kataoka et al.

(10) Patent No.: US 12,100,424 B2
(45) Date of Patent: Sep. 24, 2024

(54) INFORMATION PROCESSING METHOD, INFORMATION PROCESSING APPARATUS, PROGRAM, AND INFORMATION PROCESSING SYSTEM

(71) Applicants: DAIKIN INDUSTRIES, LTD., Osaka (JP); Fairy Devices Inc., Tokyo (JP)

(72) Inventors: Taro Kataoka, Osaka (JP); Masato Fujino, Tokyo (JP)

(73) Assignees: DAIKIN INDUSTRIES, LTD., Osaka (JP); Fairy Devices Inc., Tokyo (JP)

( * ) Notice: Subject to any disclaimer, the term of this patent is extended or adjusted under 35 U.S.C. 154(b) by 0 days.

(21) Appl. No.: 17/998,390

(22) PCT Filed: May 10, 2021

(86) PCT No.: PCT/JP2021/017643
§ 371 (c)(1),
(2) Date: Nov. 10, 2022

(87) PCT Pub. No.: WO2021/230181
PCT Pub. Date: Nov. 18, 2021

(65) Prior Publication Data
US 2023/0186952 A1    Jun. 15, 2023

(30) Foreign Application Priority Data
May 14, 2020   (JP) ................. 2020-084910

(51) Int. Cl.
*G11B 27/00*    (2006.01)
*G11B 27/02*    (2006.01)
(Continued)

(52) U.S. Cl.
CPC ............ *G11B 27/005* (2013.01); *G11B 27/19* (2013.01)

(58) Field of Classification Search
CPC ......... G11B 27/00; G11B 27/19; G11B 27/02; G11B 27/10; G11B 27/36; G11B 19/00;
(Continued)

(56) References Cited

U.S. PATENT DOCUMENTS 5,546,598 A    8/1996  Yamaguchi et al.
8,290,345 B2 * 10/2012  Numoto ................ H04H 60/65
                                                  386/280
(Continued)

FOREIGN PATENT DOCUMENTS

EP    3404658      11/2018
JP    2001-028046   1/2001
(Continued)

OTHER PUBLICATIONS

International Preliminary Report on Patentability for PCT/JP2021/017643 mailed on Nov. 24, 2022.
(Continued)

*Primary Examiner* — Daquan Zhao
(74) *Attorney, Agent, or Firm* — IPUSA, PLLC

(57) ABSTRACT

An information processing apparatus executes a process of: reproducing a moving image in which an object is captured when the object is changed from a first state to a second state, when the object is returned to the first state from the second state.

13 Claims, 7 Drawing Sheets

(51) Int. Cl.
*G11B 27/19* (2006.01)
*G11B 15/00* (2006.01)
*G11B 17/00* (2006.01)

(58) Field of Classification Search
CPC ......... G11B 17/00; G11B 15/00; G11B 11/00; G11B 31/00
USPC .................. 386/278, 280, 241, 239, 248
See application file for complete search history.

(56) References Cited

U.S. PATENT DOCUMENTS

| | | | |
|---|---|---|---|
| 11,442,609 B1 * | 9/2022 | Noël | H04N 21/4312 |
| 2003/0111754 A1 * | 6/2003 | Hinzpeter | B30B 11/005 |
| | | | 425/162 |
| 2006/0085088 A1 | 4/2006 | Nakayama et al. | |
| 2017/0280066 A1 * | 9/2017 | Hayashi | H04N 5/272 |
| 2019/0205340 A1 | 7/2019 | Jhawar et al. | |
| 2019/0304284 A1 | 10/2019 | Takeuchi et al. | |
| 2020/0293019 A1 * | 9/2020 | Putman | G06N 3/006 |

FOREIGN PATENT DOCUMENTS

| | | |
|---|---|---|
| JP | 2002-056406 | 2/2002 |
| JP | 2004-030623 | 1/2004 |
| JP | 2016-004179 | 1/2016 |
| JP | 2016-144846 | 8/2016 |
| JP | 2019-176423 | 10/2019 |
| JP | 2020-052664 | 4/2020 |
| WO | 2019/081350 | 5/2019 |

OTHER PUBLICATIONS

International Search Report for PCT/JP2021/017643 mailed on Jul. 20, 2021.
Extended European Search Report issued on Oct. 9, 2023 with respect to the related European patent application No. 21803455.1.

* cited by examiner

FIG.5A

| OPERATOR ID | OPERATION ID | OPERATION INFORMATION | MOVING IMAGE | TAG GROUP 121 |
|---|---|---|---|---|
| OPERATOR A | OPERATION A | OPERATION INFORMATION A | MOVING IMAGE A | TAG GROUP A |
|  | OPERATION B | OPERATION INFORMATION B | MOVING IMAGE B | TAG GROUP B |
|  | ⋮ | ⋮ | ⋮ | ⋮ |
| OPERATOR B | ⋮ | ⋮ | ⋮ | ⋮ |
| ⋮ |  |  |  |  |

FIG.5B

| TAG GROUP A | | 1211 |
|---|---|---|
| OPERATION ITEM | START TIME | END TIME |
| MOVEMENT OF ON-SITE ARTICLE | TIME A1 | TIME A2 |
| CURING | TIME B1 | TIME B2 |
| DEVICE DISASSEMBLY | TIME C1 | TIME C2 |
| MAIN PURPOSE OPERATION | TIME D1 | TIME D2 |
| DEVICE ASSEMBLY | TIME E1 | TIME E2 |
| CURING REMOVAL | TIME F1 | TIME F2 |
| MOVEMENT OF ON-SITE ARTICLE TO ORIGINAL POSITION | TIME G1 | TIME G2 |

INFORMATION PROCESSING METHOD, INFORMATION PROCESSING APPARATUS, PROGRAM, AND INFORMATION PROCESSING SYSTEM

TECHNICAL FIELD

The present invention relates to an information processing method, an information processing apparatus, a program, and an information processing system.

BACKGROUND ART

Conventionally, techniques are known for displaying text and animations to assist operators in their operation (see, for example, PTL 1).

CITATION LIST

Patent Literature

[PTL 1]
Japanese Laid-Open Patent Publication No. 2016-144846

SUMMARY OF INVENTION

Technical Problem

However, with the conventional technology, it may be difficult, for example, to adequately assist operators in their operation.

An object of the present disclosure is to provide technology capable of adequately assisting operators in their operation.

Solution to Problem

In an information processing method according to a first aspect of the present disclosure, an information processing apparatus executes a process of: reproducing a moving image in which an object is captured when the object is changed from a first state to a second state, when the object is returned to the first state from the second state. Accordingly, it is possible to adequately assist operators in their operation.

A second aspect of the present disclosure is the information processing method of the first aspect, wherein in reproducing the moving image, a reproduction position is determined based on at least one of a point in time when a user performs a predetermined operation and a point in time when the user speaks a predetermined utterance while the moving image is being captured.

A third aspect of the present disclosure is the information processing method of the first aspect or the second aspect, wherein in reproducing the moving image, the moving image for a predetermined period is reproduced in a reverse direction.

A fourth aspect of the present disclosure is the information processing method of the third aspect, wherein in reproducing the moving image, the predetermined period is determined based on an operation period during which a predetermined operation is performed, the operation period being estimated based on at least one of an utterance of a user and the moving image.

A fifth aspect of the present disclosure is the information processing method of the fourth aspect, wherein in reproducing the moving image, information indicating a procedure for assembly is further presented to the user, in a case where the predetermined operation is an operation in which a procedure for disassembly and the procedure for assembly are different.

A sixth aspect of the present disclosure is the information processing method of any of the first aspect to the fifth aspect, wherein in reproducing the moving image, information indicating a predetermined operation is presented to the user, the predetermined operation being estimated based on at least one of an utterance of a user and the moving image.

A seventh aspect of the present disclosure is the information processing method of any of the first aspect to the sixth aspect, wherein the information processing apparatus executes a process of presenting an error in an operation of returning the object from the second state to the first state, based on the moving image.

An eighth aspect of the present disclosure is the information processing method of any of the first aspect to the seventh aspect, wherein in reproducing the moving image, information indicating a set procedure is presented to the user, in a case where an operation of a user recognized based on the moving image is different from the set procedure.

A ninth aspect of the present disclosure is the information processing method of any of the first aspect to the eighth aspect, wherein in reproducing the moving image, the moving image is reproduced by shortening a reproduction time during a period in which a state of the object is not changed.

A tenth aspect of the present disclosure is the information processing method of any of the first aspect to the ninth aspect, wherein in reproducing the moving image, an area where a state of the object is changing is enlarged and displayed on a screen.

An information processing apparatus according to an eleventh aspect of the present disclosure executes a process of: reproducing a moving image in which an object is captured when the object is changed from a first state to a second state, when the object is returned to the first state from the second state.

A program according to a twelfth aspect of the present disclosure causes an information processing apparatus to execute a process of: reproducing a moving image in which an object is captured when the object is changed from a first state to a second state, when the object is returned to the first state from the second state.

In an information processing system according to a thirteenth aspect of the present disclosure including a server; and a terminal, the server is configured to transmit information to the terminal, the information is for reproducing a moving image in which an object is captured by the terminal when the object is changed from a first state to a second state, when the object is returned to the first state from the second state, and the terminal is configured to reproduce the moving image and display the moving image on a screen based on the information received from the server.

BRIEF DESCRIPTION OF THE DRAWINGS

FIG. 5A is a diagram illustrating an example of an operation DB according to an embodiment;

FIG. 5B is a diagram illustrating an example of a tag group according to an embodiment.

DESCRIPTION OF EMBODIMENTS

Figure 1:
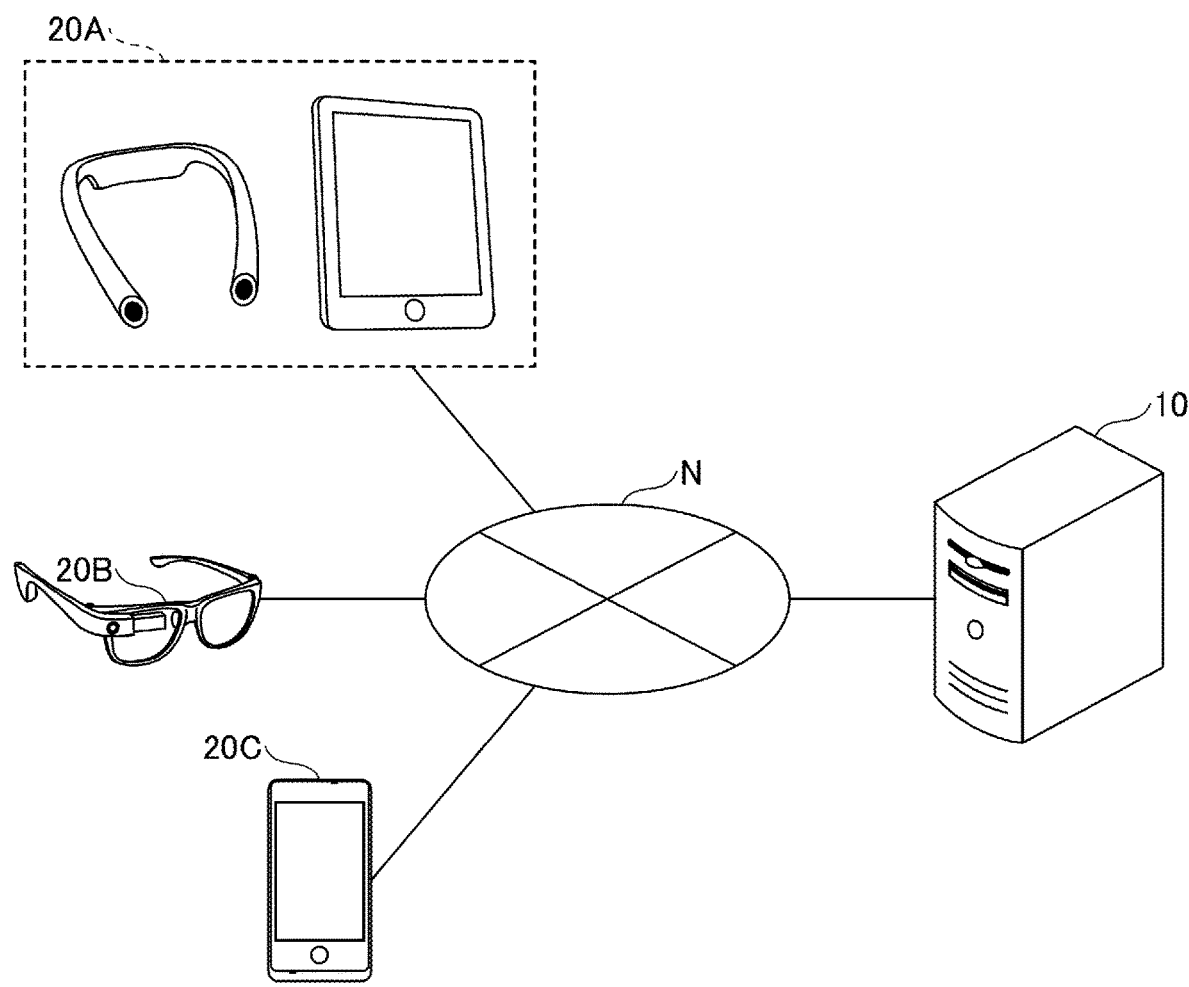
FIG. 1 is a diagram illustrating an example of a system configuration of a communication system according to an embodiment.

Hereinafter, each embodiment will be described with reference to the drawings. In the present specification and the drawings, components having substantially the same functional configuration are denoted by the same reference numerals, thereby omitting redundant description.

<System Configuration>

First, a system configuration of a communication system 1 will be described. FIG. 1 is a diagram illustrating an example of a system configuration of the communication system 1 according to an embodiment. As illustrated in FIG. 1, the communication system 1 includes a server 10, and, a terminal 20A, a terminal 20B, and a terminal 20C (hereinafter simply referred to as a "terminal 20" when it is not necessary to distinguish them). The number of the servers 10 and the terminals 20 is not limited to the example of FIG. 1.

The server 10 and the terminal 20 may communicate via a network N such as a Local Area Network (LAN), a wireless LAN, the Internet, and a mobile phone network, for example. The mobile phone network may comply with communication standards such as fifth generation mobile communication system (5G), 4G, and Long Term Evolution (LTE), for example.

The terminal 20 is, for example, an information processing apparatus that includes a camera that captures a moving image, a microphone that collects sounds, a display, and a communication device. The terminal 20 may include a plurality of information processing apparatuses. In this case, the terminal 20 may include, for example, a wearable device having a camera or the like and an information processing apparatus having a display or the like. In this case, the information processing apparatus having a display or the like may be, for example, a tablet terminal, a smartphone, a notebook personal computer (PC), or the like. In this case, the wearable device may be connected to the network N via a tablet terminal or the like, or may be connected to the network N without the tablet terminal or the like.

The terminal 20 may be, for example, a head-mounted display augmented reality wearable computer (smart glasses) that can be worn on the head of an operator (user).

The server 10 stores the moving image captured by the terminal 20 and causes the terminal 20 to display contents based on the stored moving image and the like. For example, the server 10 stores a moving image (hereinafter, also referred to as a "moving image at the time of change") at a worksite of an operator using the terminal 20, the moving image being captured by the terminal 20 when an object such as an article (devices and installations) to be operated at the site and facilities at the site is changed from the first state (the original state) to the second state. The server 10 causes the terminal 20 to reproduce (reverse reproduction, reverse play) the moving image in the reverse direction (back in time) or reproduce (forward reproduction, normal play) the moving image in the forward direction (forward in time) when the operator performs an operation to restore (restore to original state, reset, recover, reconstruct, and repair) the object to be operated from the second state to the first state. Accordingly, for example, it is possible to adequately support the operation of moving (removing) the article installed on the site, installing curing and scaffolding, and then, after completion of the construction and the like, removing the curing and scaffolding and returning the article to its original position. Also, for example, it is possible to adequately support the operation of disassembling a device, removing wiring of a component within the device, and then, after replacing the component with a new component, reconnecting the wiring and reassembling the device.

Hereinafter, reverse reproduction and forward reproduction are referred to as simply "reproduction" as appropriate. The server 10 may allow each operator of each terminal 20 to specify in advance whether to perform reverse reproduction or forward reproduction of the moving image in accordance with the operation of each operator of each terminal 20.

<Hardware Configuration of Server 10 and Terminal 20>

Figure 2:
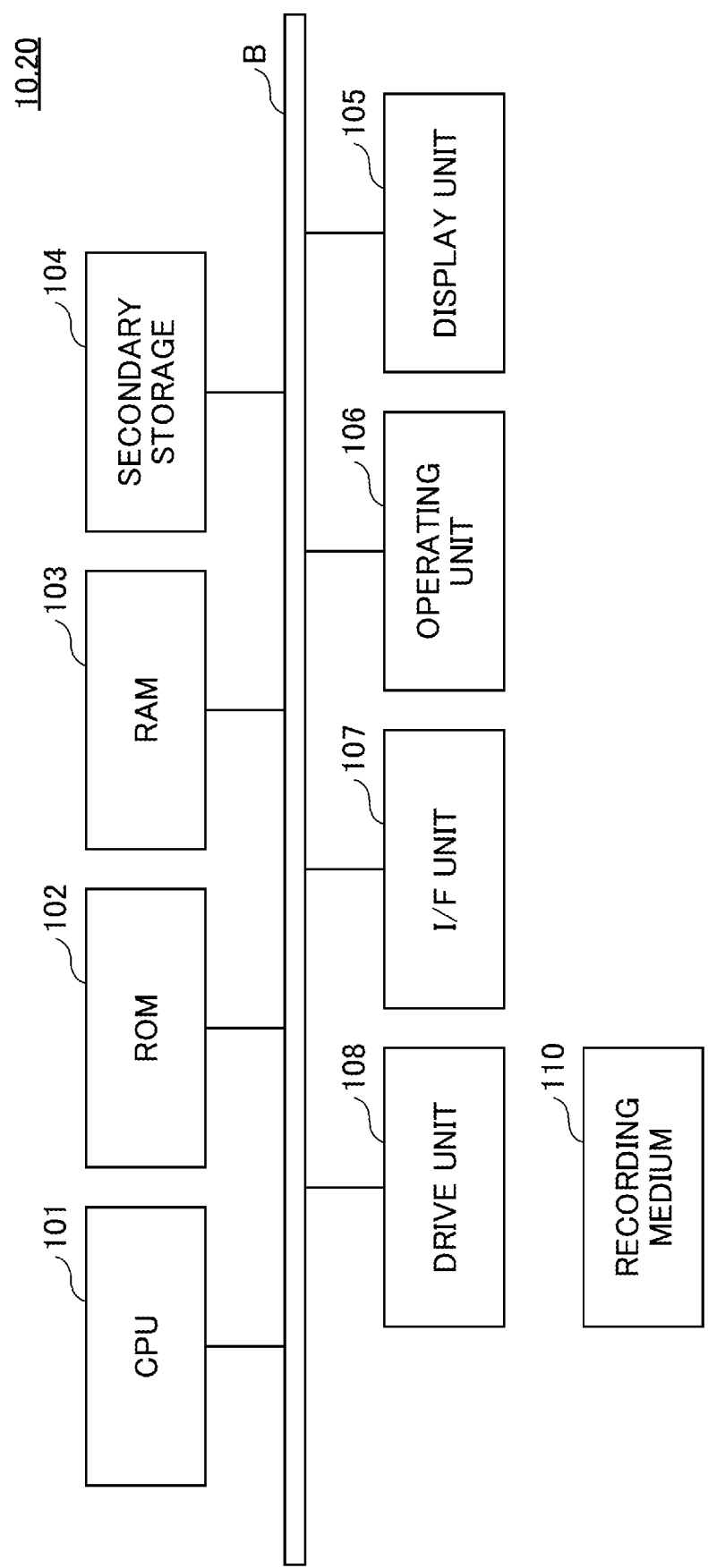
FIG. 2 is a diagram illustrating an example of a hardware configuration of a server and a terminal according to an embodiment.

Next, the hardware configuration of the server 10 and the terminal 20 according to the embodiment will be described. FIG. 2 is a diagram illustrating an example of the hardware configuration of the server 10 and the terminal 20 according to an embodiment. Hereinafter, the server 10 will be described as an example, but the hardware configuration of the terminal 20 may be the same as the hardware configuration of the server 10.

As illustrated in FIG. 2, the server 10 includes a central processing unit (CPU) 101, a read only memory (ROM) 102, and a random access memory (RAM) 103. The CPU 101, the ROM 102, and the RAM 103 constitute a so-called computer. The server 10 includes a secondary storage 104, a display unit 105, an operating unit 106, an interface (I/F) unit 107, and a drive unit 108. Each of the hardware of the server 10 is interconnected via a bus B.

The CPU 101 is a processor that executes various programs (for example, a machine learning program and the like) installed in the secondary storage 104. The ROM 102 is a non-volatile memory. The ROM 102 functions as a primary storage to store various programs, data, and the like, required by the CPU 101 to execute various programs installed in the secondary storage 104. Specifically, the ROM 102 stores boot programs and the like such as the Basic Input/Output System (BIOS) and the Extensible Firmware Interface (EFI).

The RAM 103 is a volatile memory such as a dynamic random access memory (DRAM), a static random access memory (SRAM), and the like. The RAM 103 functions as a primary storage to provide a work area into which various programs installed in the secondary storage 104 are loaded when executed by the CPU 101.

The secondary storage 104 stores various programs and information that is used when various programs are executed.

The display unit 105 is a display device that displays various kinds of information. The operating unit 106 is an operation device for receiving various operations. The I/F unit 107 is a communication device that communicates with external apparatuses.

The drive unit 108 is a device for loading a recording medium 110. The recording medium 110 herein includes media that optically, electrically, or magnetically record information, such as a CD-ROM, a flexible disk, a magneto-optical disk, or the like. The recording medium 110 may also include semiconductor memories and the like that electrically record information, such as ROM, flash memory, and the like.

For example, the various programs are installed in the secondary storage 104 as follows. The recording medium 110 as distributed is loaded into the drive unit 108, and various programs recorded in the recording medium 110 are read by the drive unit 108 to be installed. Alternatively, various programs may be downloaded from a network that is not depicted to be installed in the secondary storage 104.

<Functional Configuration>

Figure 3:
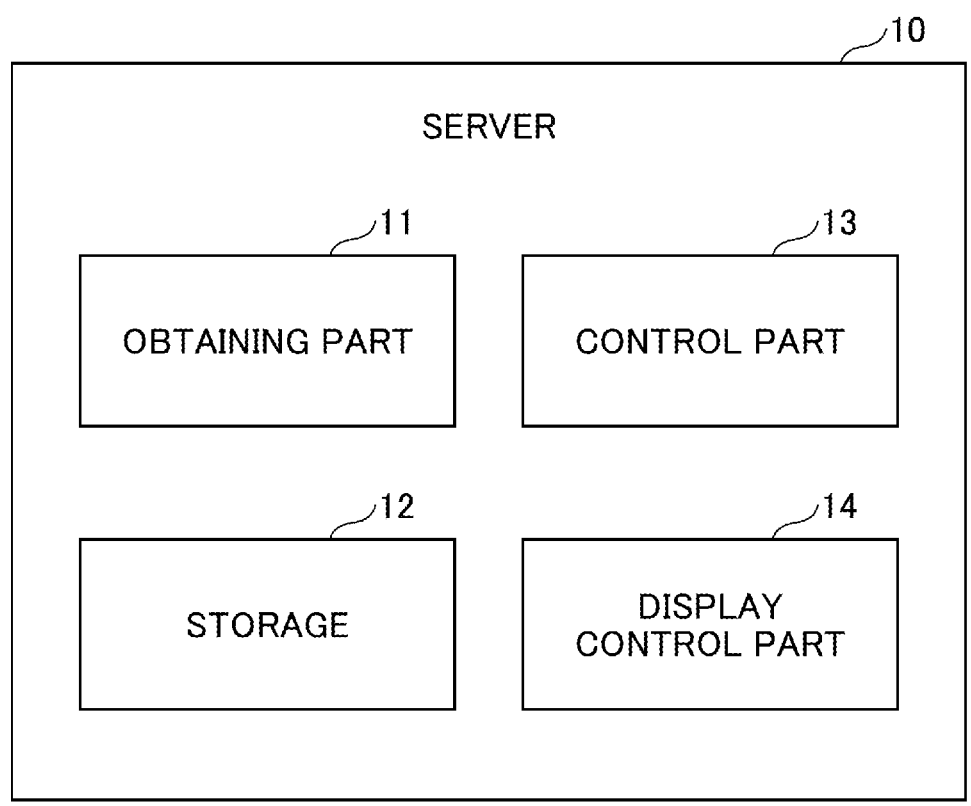
FIG. 3 is a diagram illustrating an example of a functional configuration of the server according to an embodiment.

Next, a functional configuration of the server 10 according to the embodiment will be described with reference to FIG. 3. FIG. 3 is a diagram illustrating an example of the functional configuration of the server 10 according to an embodiment.

The server 10 includes an obtaining part 11, a storage 12, a control part 13, and a display control part 14. Each of these parts may be implemented by, for example, cooperation between one or more programs installed in the server 10 and hardware such as the CPU 101 of the server 10.

The obtaining part 11 obtains various information from the terminal 20. The storage 12 stores various information. The storage 12 includes, for example, an operation database (DB) 121.

The control part 13 controls each part of the server 10. The display control part 14 transmits the information to be displayed on the terminal 20 to the terminal 20 and controls the display screen displayed on the terminal 20.

<Processing>

Figure 4:
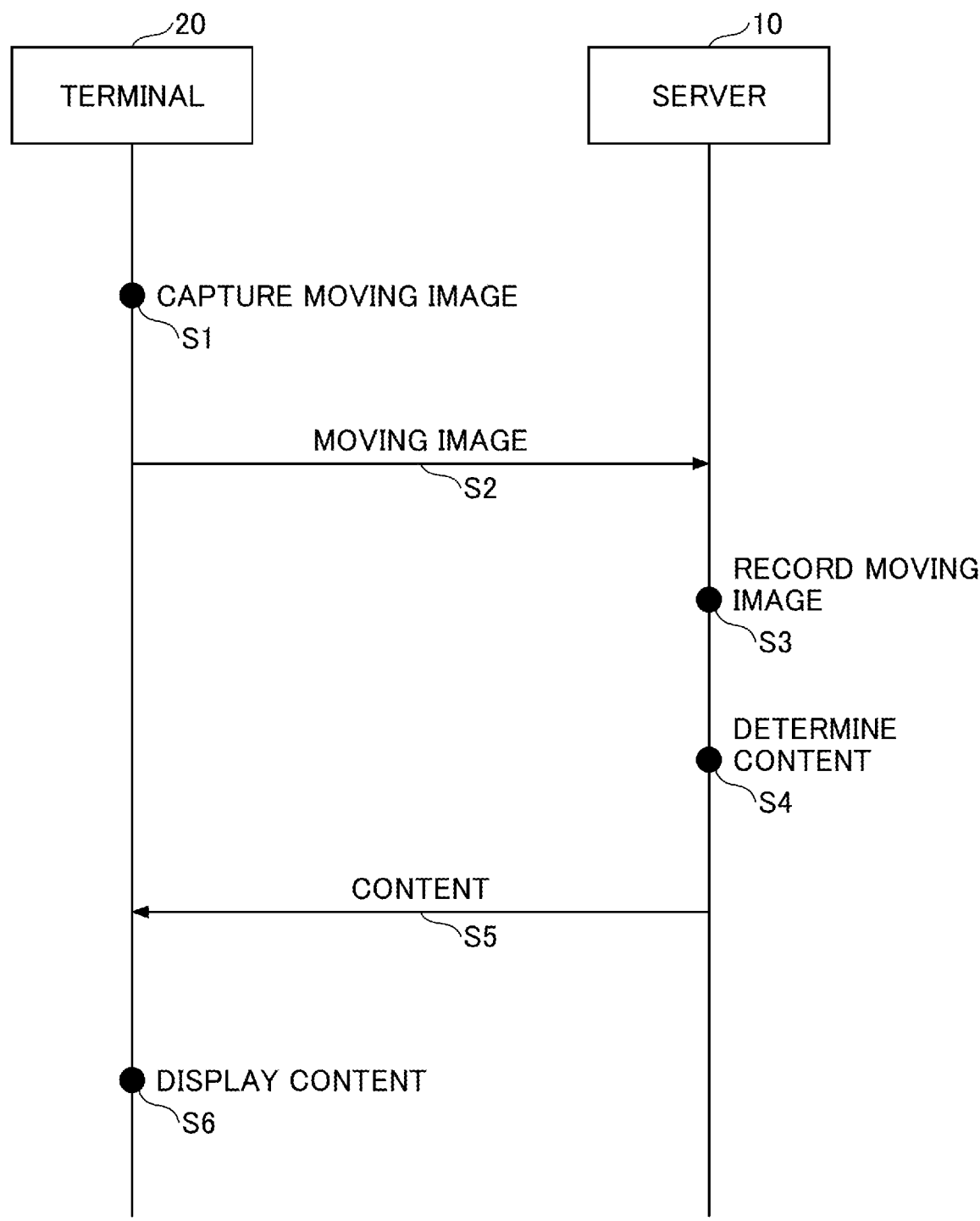
FIG. 4 is a sequence diagram illustrating an example of processing of a communication system according to an embodiment.
Figure 6:
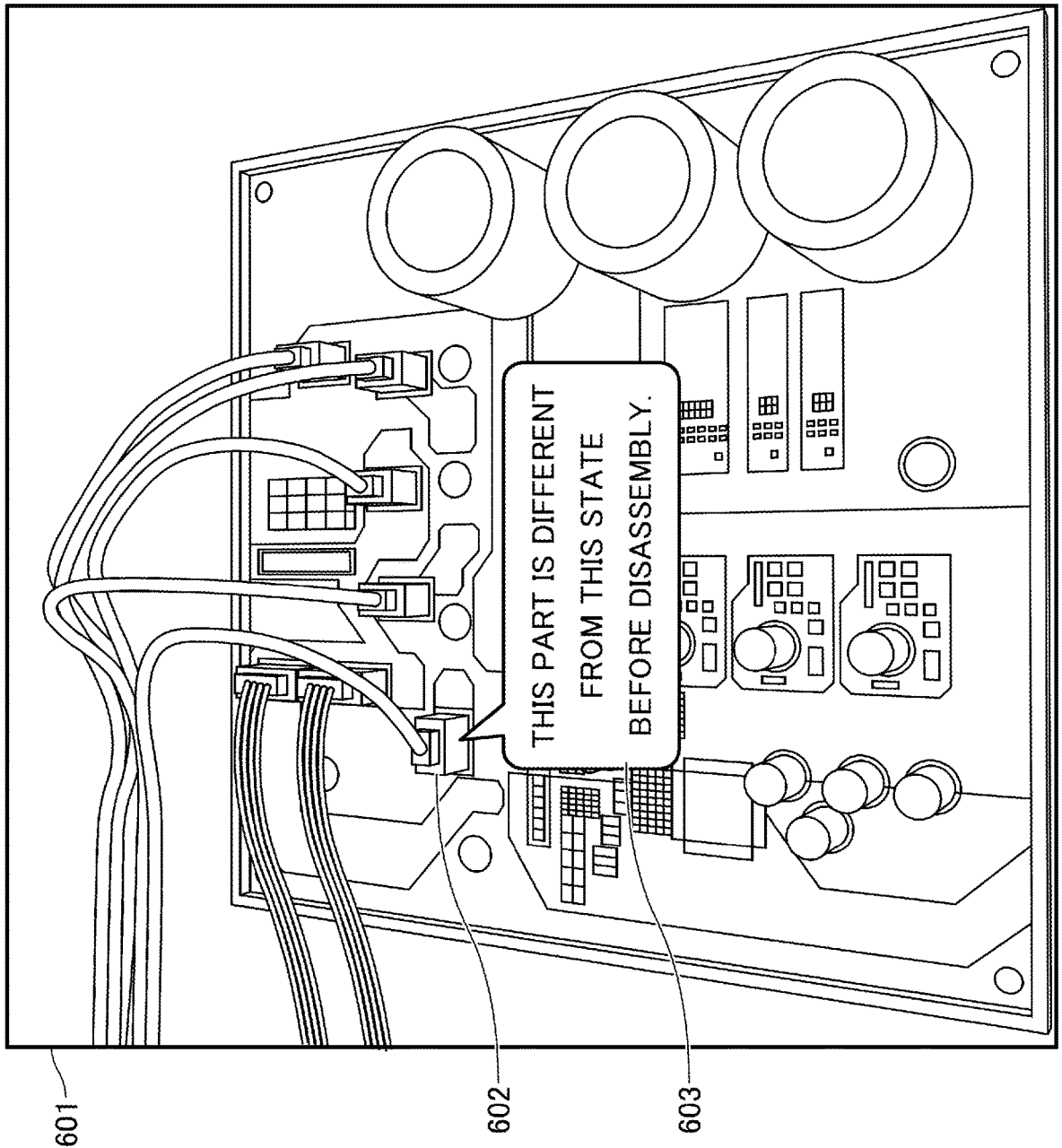
FIG. 6 is a diagram illustrating an example of a display screen of a terminal according to an embodiment.

Next, an example of processing of the communication system 1 according to the embodiment will be described with reference to FIGS. 4 to 6. FIG. 4 is a sequence diagram illustrating an example of processing of the communication system 1 according to the embodiment. FIG. 5A is a diagram illustrating an example of the operation DB 121 according to the embodiment. FIG. 5B is a diagram illustrating an example of a tag group according to the embodiment. FIG. 6 is a diagram illustrating an example of a display screen of the terminal 20 according to the embodiment.

The terminal 20 may log in to the server 10 by user authentication from the server 10 using an operator ID and password and may perform the following communication by an encrypted communication session using Hypertext Transfer Protocol Secure (HTTPS).

In step S1, when an object is changed from a first state to a second state, the terminal 20 captures a moving image in which the object is a subject. Subsequently, the terminal 20 transmits the captured moving image to the server 10 (step S2). For example, the terminal 20 may transmit the captured moving image to the server 10 in real time. The terminal 20 may, for example, transmit the captured and recorded moving image to the server 10 in response to an operation by an operator.

Subsequently, the control part 13 of the server 10 records the received moving image in the operation DB 121 of the storage 12 (step S3). In the example of the operation database (DB) 121 illustrated in FIG. 5A, the server 10 records the received moving image in association with tags. In the example of FIG. 5A, operation information, the moving image, and a set of tag groups (a dataset) are recorded in association with an operator ID and an operation ID.

The operator ID is identification information of the operator using the terminal 20. The operation ID is identification information of the operation to be performed by the operator. The operation information is a variety of information related to the operation. The operation information may include, for example, information indicating the date and time, location, customer name, device to be operated, and contents of the operation. The server 10 may receive and record the operation information input by the operator into the terminal 20 from the terminal 20.

In the example of FIG. 5B, each tag included in a tag group A1211 associated with the moving image of FIG. 5A includes set data of an operation item, start time, and end time. The operation item is information indicating each item performed in the operation. The start time and the end time are the start time and the end time of the operation period corresponding to each item. The control part 13 of the server 10 may receive from the terminal 20 the tags input by the operator into the terminal 20 and record the tags. The control part 13 of the server 10 may generate tags based on at least one of the moving image received from the terminal 20 and a sound.

(Generation of Tag Based on Utterance)

The server 10 may generate the tag based on an utterance of the operator of the terminal 20. In this case, for example, the server 10 may recognize a voice received from the terminal 20 and generate a tag based on the time when the voice is spoken and the result of the voice recognition. Accordingly, when the object is changed from the first state to the second state in the moving image (an example of "while the moving image is being captured"), a tag can be added at the point instructed by the operator.

The server 10 may, for example, estimate a period during which a predetermined operation item is operated based on the utterance of the operator of the terminal 20. In this case, the server 10 may, for example, recognize by artificial intelligence (AI) the voice of the operator "start movement of on-site article" to generate an operation item "movement of on-site article" and record the time when the voice was spoken as the start time of the operation item. The server 10 may, for example, recognize the voice of the operator as "end" by AI and record the time when the voice was spoken as the end time of the operation item. For example, when the start time of another operation item is recorded while no end time of one operation item is recorded, the server 10 may record the time based on the start time of the other operation item as the end time of the one operation item.

(Generation of Tag Based on Operator Input Procedure)

The server 10 may generate the tag based on an input operation of the operator of terminal 20. In this case, the server 10 may generate the tag, for example, based on information entered by the operator of the terminal 20. In this case, the terminal 20 may, for example, accept an operation to designate an operation item, an operation to designate the current date and time as the start time, or an operation to designate the current date and time as the end time.

(Generation of Tag Based on Moving Image and the Like)

The server 10 may also estimate a period during which operation of a predetermined operation item is being performed based on at least one of the utterance by the operator of the terminal 20 and the moving image captured by the terminal 20, and generate a tag. In this case, the server 10 may recognize (infer) the operation item, the start time, and the end time based on the moving image, for example, by AI using machine learning such as deep learning. The server 10 may also recognize at least one of the operation item, the start time, and the end time based on the utterance by the operator of the terminal 20 by AI.

Subsequently, the control part 13 of the server 10 determines the content to be distributed to the terminal 20 (step S4). The server 10 may, for example, cause the contents to be reproduced by the terminal 20 when the object is returned to the first state from the second state.

(Determination of Reproduction Position Based on Tag Designated by Operator)

In the process of step S4, the server 10 may determine a reproduction position of the moving image based on the tag designated by the operator. In this case, the terminal 20 may accept an operation to designate a tag from the operator when the operator restores the object from the second state to the first state. The server 10 may, for example, cause the terminal 20 to display a list of each tag included in the tag group recorded in the operation DB 121 of FIG. 5A and allow the operator to select one tag. The server 10 may recognize the voice spoken by the operator and determine the tag of the operation item designated by the voice.

The server 10 may determine a start position (a reproduction start position) and an end position (a reproduction end position) of a period in which the moving image is reproduced based on the start time and the end time of the designated tag with reference to the operation DB 121 of FIG. 5A. The server 10 may use the start time and the end time of the designated tag as the start position and the end position of the moving image to be reproduced by the terminal 20, respectively.

The server 10 may set the end time and the start time of the designated tag to be the start position and the end position of the moving image to be reproduced by the terminal 20, respectively, so that the moving image may be reproduced in the reverse direction by the terminal 20. Accordingly, for example, when assembling and restoring a disassembled device, the operator can view the moving image, which has been captured in disassembling the device, reproduced in the reverse direction. Therefore, by using the moving image representing the reverse procedure of disassembling the device, the procedure for assembling the device to its original state can be adequately understood.

When the terminal 20 reproduces the moving image, the server 10 may provide the operator with information indicating the operation item associated with the moving image (an example of "information indicating an operation"). In this case, for example, the server 10 may superimpose the character data of the operation item of the designated tag on the moving image. Accordingly, for example, when the reverse reproduction of the moving image is started, the operator can grasp the contents of the operation item to be performed. The server 10 may also cause the terminal 20 to reproduce the sound when the tag is a tag generated based on the voice of the operator.

(Presentation of Assembly Procedure)

The server 10 may provide information to the operator indicating an assembly procedure when the operation item of the tag designated by the operator is an operation item in which a disassembly procedure and the assembly procedure are different. Accordingly, when the disassembly procedure differs from the assembly procedure, the operator can adequately understand the procedure for assembling the device to its original state based on the assembly procedure manual or the like. Thus, for example, it can be assembled in a more suitable procedure.

In this case, for example, when the designated operation item is "device assembly" and it is registered in advance in the server 10 that the device to be operated is of a model in which a disassembly procedure and an assembly procedure are different, the server 10 may cause the terminal 20 to display the data of an assembly procedure manual for the model.

(Presentation of Model Procedure)

The server 10 may provide information to the operator indicating a procedure set as a model when the procedure of the operation of the operator recognized based on the moving image differs from the procedure set as the model. Accordingly, for example, in cases where the operator has taken time to disassemble the device, performed unnecessary procedures, or the like, the procedure of the assembly operation set as the model can be presented to the operator.

In this case, for example, the server 10 may recognize the order in which the first state is changed to the second state by the operator based on the moving image by AI or the like. When the degree of deviation between the recognized procedure and the procedure set as the model is equal to or greater than a threshold value, the server 10 may reproduce a moving image of the procedure set as the model.

The server 10 may, for example, set the procedure recognized based on the moving image of the operation performed by a highly-skilled operator as the model. In this case, the server 10 may present a procedure by an operator B to an operator A, for example, when the value of the ratio of the time required for the disassembly operation for the device to be operated by the operator A to the time required for the disassembly operation for the device to be operated by the operator B is equal to or greater than a threshold value.

Subsequently, the display control part 14 of the server 10 distributes the determined content to the terminal 20 (step S5). Subsequently, the terminal 20 displays the received content (step S6).

In the processing of step S5, the server 10 may reproduce the moving image by shortening a reproduction time during a period in which a state of the article to be operated remains unchanged. Accordingly, for example, during assembly, it is possible to omit the time during which the moving image is reproduced when the operation has not progressed during disassembly.

In this case, for example, the server 10 may skip (jump) a part of the moving image during which the hand of the operator is not captured to reproduce the moving image. The server 10 may recognize the arrangement of each article by AI based on the moving image, and skip the moving image during which the arrangement is not changed to reproduce the moving image.

The server 10 may enlarge an area where the state of the article to be operated is changing and display the area on the screen. Accordingly, for example, the area where the operator was operating at the time of disassembly can be enlarged and presented to the operator.

In this case, for example, the server 10 may enlarge (zoom) and reproduce the area where the operator's hand is captured in the moving image. The server 10 may recognize the arrangement of each article based on the moving image by AI and enlarge and reproduce the area where the arrangement is changed.

(Presentation of Error in Restoration Operation)

The server 10 may present an error to the operator in the operation of restoring the article to be operated from the second state to the first state based on the moving image at the time of the change and the moving image at the time of restoring the article to be operated from the second state to the first state. Accordingly, for example, the operator can grasp that there is a portion different from the original state.

In this case, the server 10 may first detect that the operation item currently being performed by the operator has been completed, for example. The server 10 may, for example, detect that the operation item has been completed on the basis of the moving image (hereinafter, referred to as a "current moving image" as appropriate) that is currently captured by the terminal 20 and transmitted from the terminal 20 to the server 10 in real time. In this case, the server 10 may determine that the operation item has been completed, for example, when it detects that the cover of the housing of the device to be operated is closed by the operator based on the moving image.

The server 10 may detect that the operation item has been completed based on voice or manual operation from the operator.

The server 10 may determine that an error has occurred when the arrangement of each subject before the change in the moving image at the time of the change and the arrangement of each subject in the moving image at the time of completion of the operation item are different. In this case, the server 10 may determine that an error has occurred as follows. For example, a first still image at the start of the disassembly operation is enlarged/reduced, rotated, and translated to determine the situation that best matches a second still image at the end of the assembly operation. When the number of pixels, whose RGB value difference between the images is equal to or greater than the threshold in the matching situation, is equal to or greater than the threshold, it is determined that an error has occurred.

The server 10 may cause the terminal 20 of the operator to output a warning message and sound. The server 10 may cause the terminal 20 to reproduce the moving image or the still image of a predetermined period including the point in time when the arrangement of the subject in which the error has been detected is changed. As illustrated in FIG. 6, a predetermined display object may be superimposed on the moving image or the still image in association with the subject.

In the example of FIG. 6, the server 10 displays, on the display screen 601 of the terminal 20, the moving image at the time of change superimposed by a display object 603 in association with the connector 602 of the cable before the change. The display object 603 includes a message indicating that an error is detected during assembly compared to the state before the disassembly.

(Reproduction According to Status of Each Subject)

The server 10 may reproduce the moving image at the time of the change, according to the condition of each subject in the moving image captured when the operator restores the article to be operated from the second state to the first state. Accordingly, for example, each time the operator executes each procedure, the operator can be presented with a moving image representing the next procedure.

In this case, the server 10 may first determine the order of each subject whose state is changed based on the moving image at the time of the change. When detecting that a first subject has been returned to the first state from the second state based on the current moving image, the server 10 may reproduce the moving image when the state of a second subject that is the subject that was changed just before the first subject has been changed. Accordingly, for example, when the situation of the cable currently being captured by the terminal 20 becomes the same as the situation at the start of removing the cable, the moving image when the cable to be connected next is removed may be reproduced to the operator in reverse direction or the like.

<Variation>

Each of the functional portions of the server 10 may be implemented, for example, by cloud computing provided by one or more computers. Each processing of the server 10 may be performed by the terminal 20. In this case, at least a portion of the processing of the storage 12, the control part 13, and the display control part 14 may be processed by the terminal 20. The storage 12, the control part 13, and the display control part 14 may be provided in the terminal 20, and the configuration without the server 10 (stand-alone type configuration) may be employed.

While the embodiments have been described, it will be understood that various modifications of form and detail may be made without departing from the spirit and scope of the claims.

The present application claims priority to Japanese Patent Application No. 2020-84910, filed May 14, 2020, with the Japanese Patent Office, the contents of which are incorporated herein by reference in their entirety.

DESCRIPTION OF THE REFERENCE NUMERAL

1 Communication system
10 Server
11 Obtaining part
12 Storage
13 Control part
14 Display control part
20 Terminal

The invention claimed is:

1. An information processing method in which an information processing apparatus executes a process of:
    capturing a moving image of an object when the object is changed from a first state to a second state;
    adding a tag to an image of the object in the second state among images constituting the moving image and storing the moving image in association with the tag in a storage; and
    reproducing, when the object is to be returned to the first state from the second state, the moving image in a reverse direction from a reproduction position determined based on the tag.

2. The information processing method according to claim 1, wherein in reproducing the moving image, at least one of a start position or an end position of a period in which the moving image is reproduced is determined based on at least one of a point in time when a user performs a predetermined operation and a point in time when the user speaks a predetermined utterance while the moving image is being captured.

3. The information processing method according to claim 1, wherein in reproducing the moving image, the moving image for a predetermined period is reproduced in the reverse direction.

4. The information processing method according to claim 3, wherein in reproducing the moving image, the predetermined period is determined based on an operation period during which a predetermined operation is performed, the operation period being estimated based on at least one of an utterance of a user and the moving image.

5. The information processing method according to claim 4, wherein in reproducing the moving image, information indicating a procedure for assembly is further presented to the user, in a case where the predetermined operation is an operation in which a procedure for disassembly and the procedure for assembly are different.

6. The information processing method according to claim 1, wherein in reproducing the moving image, information indicating a predetermined operation is presented to the user, the predetermined operation being estimated based on at least one of an utterance of a user and the moving image.

7. The information processing method according to claim 1, wherein the information processing apparatus executes a process of presenting an error in an operation of returning the object from the second state to the first state, based on the moving image.

8. The information processing method according to claim 1, wherein in reproducing the moving image, information indicating a set procedure is presented to the user, in a case where an operation of a user recognized based on the moving image is different from the set procedure.

9. The information processing method according to claim 1, wherein in reproducing the moving image, the moving image is reproduced by shortening a reproduction time during a period in which a state of the object is not changed.

10. The information processing method according to claim 1, wherein in reproducing the moving image, an area where a state of the object is changing is enlarged and displayed on a screen.

11. An information processing apparatus that executes a process of:

capturing a moving image of an object when the object is changed from a first state to a second state;

adding a tag to an image of the object in the second state among images constituting the moving image and storing the moving image in association with the tag in a storage; and reproducing, when the object is to be returned to the first state from the second state, the moving image in a reverse direction from a reproduction position determined based on the tag.

12. A non-transitory computer-readable recording medium storing a program that causes an information processing apparatus to execute a process of:

capturing a moving image of an object when the object is changed from a first state to a second state;

adding a tag to an image of the object in the second state among images constituting the moving image and storing the moving image in association with the tag in a storage; and reproducing, when the object is to be returned to the first state from the second state, the moving image in a reverse direction from a reproduction position determined based on the tag.

13. An information processing system comprising:

a server; and a terminal, wherein the server is configured to transmit information to the terminal, the information is for capturing a moving image of an object when the object is changed from a first state to a second state; adding a tag to an image of the object in the second state among images constituting the moving image and storing the moving image in association with the tag in a storage; and reproducing, when the object is to be returned to the first state from the second state, the moving image in a reverse direction from a reproduction position determined based on the tag, and the terminal is configured to reproduce the moving image and display the moving image on a screen based on the information received from the server.

* * * * *